Figure 1:
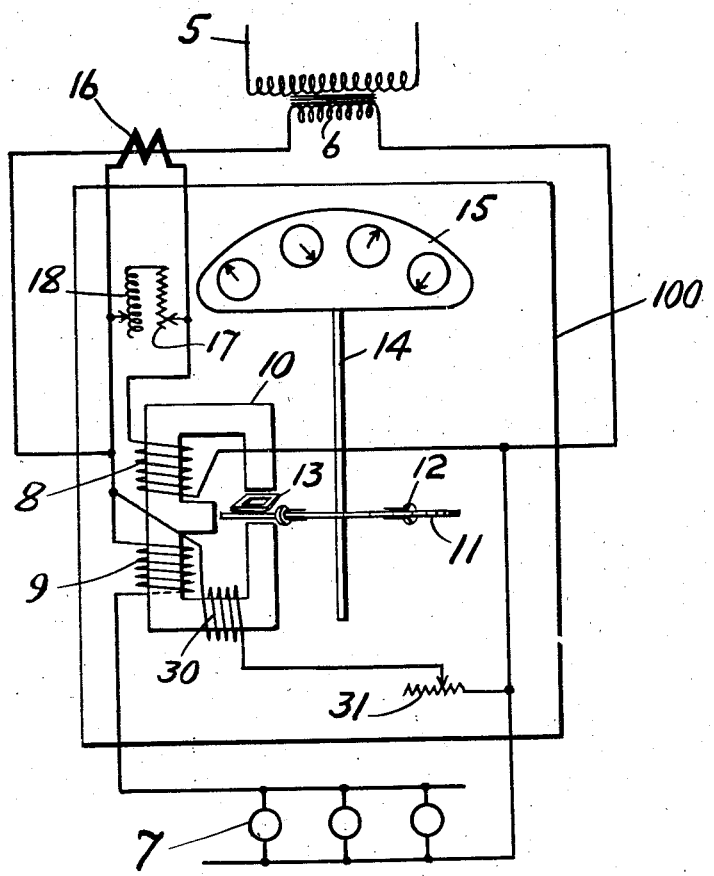

Dec. 3, 1946.  W. C. WAGNER  2,412,070
SECONDARY METER FOR PRIMARY ENERGY
Filed March 18, 1944  2 Sheets-Sheet 1

INVENTOR
Walter C. Wagner
BY
Augustus B. Stoughton
ATTORNEY.

WITNESS:

Patented Dec. 3, 1946

2,412,070

UNITED STATES PATENT OFFICE 2,412,070

SECONDARY METER FOR PRIMARY ENERGY

Walter C. Wagner, Ardmore, Pa.

Application March 18, 1944, Serial No. 527,093

2 Claims. (Cl. 171—34)

1

This invention relates to a method of and apparatus for metering the energy and demand passing through electrical-distributing equipment and, more particularly, relates to metering apparatus connected to the low-tension circuits of such equipment for measurement of the high-tension supply of electrical energy.

There are advantages in metering the energy and demand passing through an electrical-distributing apparatus, such as a power transformer, on the low-tension or low-voltage side of the apparatus irrespective of the direction of energy flow. Compared with high-tension metering, low-tension metering installations are comparatively cheaper because of lower cost of line and transformer construction, are more readily installed and maintained, are safer to test and are relatively not subject to damage by lightning and other transient surges on the high-tension lines. High-tension metering apparatus is expensive, maintenance costs are relatively high and design of primary metering is such that it does not register accurately at very light loads such as the no-load losses of power transformers. Furthermore, verification of high-tension metering is always difficult to make and the instrument transformers therewith are, because of costs and hazards, generally not tested in service. Also, service and maintenance of such high-tension installations are hazardous because of the proximity to parts which might possibly be energized at high potential.

In order that a meter connected to the low-tension side of an electrical-distributing apparatus, for example, a power transformer, may correctly indicate the energy and demand passing into the apparatus, the meter must take into account the output from the apparatus and the losses occurring in the apparatus and conductors to the point of metering. While such losses are relatively quite small as compared with the total flow of energy, it is of sufficient importance to require its inclusion in the total measurement of energy or demand. Such losses occurring in the apparatus may be divided into two classes. The first class comprises those occurring in the winding of the apparatus and its associated wiring, which are called the copper losses and which are proportional to the square of the current passing through the apparatus. The second class comprises the so-called core losses or those occurring in the core of the apparatus and are approximately proportional for a given frequency and wave-form to the square of the voltage.

It is an object of this invention to provide

2 equipment for compensating for the apparatus losses concerned at any load. I propose to accurately compensate for the copper losses by applying to the potential coil of the meter an additional voltage component proportional to the current flow through the apparatus to which the meter is connected on the low-tension side. In other words, I propose to add to that potential coil magnetic flux, which cuts the meter disk and induces Foucault currents therein, an additional flux proportional to the current flow in the apparatus. This additional component of flux interacts with the current coil flux to produce a component of torque proportional to the copper losses in the apparatus and conductors.

If my compensated meter is connected to the input side of an electrical-distributing apparatus (for example, for the measurement of energy delivered to a high-voltage transmission line by a generator at lower voltage) the compensation for the copper losses of the apparatus and conductors is subtracted from the registration of the meter. In the case where this compensated meter is connected to the output side of an electrical-distributing apparatus as in the case of a step-down transformer, the component proportional to the copper loss of the device is added to the registration of the meter.

Figure 2:
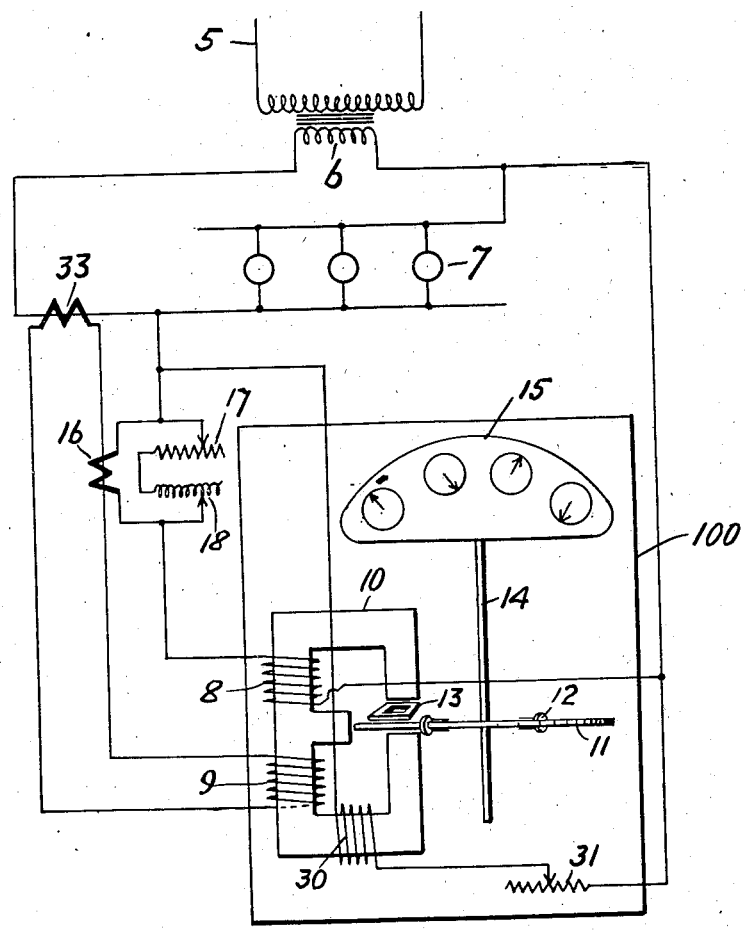

The features of my invention which I consider patentably novel are definitely indicated in the claims appended hereto. The details of arrangement and mode of operation of a satisfactory embodiment of my invention will be understood from the following description taken in connection with the accompanying drawings, in which:

Fig. 1 is a diagrammatic view of one form of my invention and the circuit connections therefor; and Fig. 2 is a similar view illustrating a modification.

Referring to the drawings, there is diagrammatically illustrated an electrical-distributing apparatus comprising a transformer having a primary winding 5 and a secondary winding 6 distributing energy to translating devices 7. An electric meter is operatively connected to the secondary winding of the transformer in such a way that it is adapted to register the total energy supplied to the transformer under any and all conditions of load. The electric meter comprises a casing or housing 100 containing a potential coil 8 and a series or current coil 9 each suitably arranged on a core 10 which may well be made of laminated magnetic material and which is adapted to form a path for the potential or voltage magnetic flux and for the series or current magnetic flux.

The rotatable element of the meter includes a disk 11 of aluminum or other suitable conducting material. The disk 11 is rotatably arranged in the well-known manner in an air gap in both the potential and series magnetic circuits. Disk 11 forms part of a standard watthour meter, which includes the usual full-load adjusting devices 12 and the light-load adjusting devices 13. Disk 11 is mounted on a shaft 14 which is connected to a register or dial 15 by suitable gearing. For the measurement of the copper losses occurring in the transformer 5, 6 and the lines associated therewith, there is employed a current transformer 16 whose primary is connected into the load circuit of secondary 6. The secondary of transformer 16, with a burden consisting of an adjustable resistor 17 and an adjustable reactor 18 to produce the desired phase relation and magnitude of the voltage component, is connected in series with the watthour meter potential coil 8. It is understood that the term "reactor" is used in the broad sense to mean either an inductor or capacitor. Resistor 17 and reactor 18 are adjusted so that the desired ampere-turn component with respect to magnitude and phase relation are added to the ampere-turns of the potential coils 8. In other words, there is added to the magnetic circuit of potential coil 8 a component of flux proportional to the load current which, interacting with the current coil flux, produces a torque proportional to the current squared or the copper losses occurring in transformer 5, 6 and its associated wiring and apparatus.

In combination with the above method of including the copper loss component in the registration of a watthour meter, it is necessary to add a component proportional to the core loss of the transformer. This core loss is closely proportional to the square of the voltage induced in the transformer. Since the so-called light-load adjustment 13 of the meter, also known as the compensation device, produces a torque which will vary as the square of the voltage applied to the potential coil 8, it is merely necessary to adjust the compensation device 13 to produce the required added component.

The drawings show one means for adding a component proportional to the core loss of the electrical-distributing apparatus. This means consists in a coil 30 connected in series with an adjustable impedance 31, coil 30 and impedance 31 being in turn connected across the voltage applied to the potential or voltage coil 8. Coil 30 is mounted on the yoke or core 10 of the electromagnet of the watthour meter in the magnetic circuit of current coil 9. By adjusting the impedance 31 in series with the coil 30, the desired torque proportional to the square of the voltage may be added to the meter disk 11. This method is described in detail in my United States Patent No. 2,218,668 dated October 22, 1940, and is particularly useful where the range of light-load adjustment of the meter is insufficient to provide the desired torque.

The operation of my improved metering device will, it is believed, be fully understood from the foregoing description. The rotatable disk 11 of the meter is subjected to a torque having three components. One component of the torque is predetermined and is substantially proportional to the core-loss or no-load losses of the transformer. This component is predetermined by the adjustment of the compensation device 13. This component is predetermined by the ampere-turns of coil 30 by adjustment of the impedance 31. A second component of the torque applied to the meter disk is substantially proportional to the copper losses of the transformer and conductors to the metering point. This torque component results from interaction in the disk of the flux from the current coil 9 and the flux in the potential coil magnetic circuit contributed by an ampere-turn component proportional to the load current. The ampere-turn component proportional to the load current is taken from the secondary of transformer 16 and its magnitude and phase angle determined by adjustment of resistor 17 and reactor 18.

The third component of torque applied to meter disk 11 is produced by interaction of the fluxes contributed by potential coil 8 and current coil 9 and is substantially proportional to the energy consumed by the translating devices 7. The first and second torque components tend to turn the meter in the same direction as the third component when the distributing apparatus losses are to be added to the energy registration of the meter and in the opposite direction when the losses are to be subtracted. When the meter is connected in the low-tension secondary of a power transformer to measure power in the high-tension primary circuit and the translating devices 7 are consuming no energy, the second and third components of the meter torque are zero and the revolutions of the rotatable element of the meter are then substantially proportional to the no-load losses of the transformer. When the meter is connected in the low-tension input circuit of a power transformer to measure power in the high tension circuit, the copper and core loss components of a torque are subtracted from the total energy component by suitably adjusting the device 13 and/or connecting the respective ampere-turn components with the proper polarity. In this case, if no energy is being delivered by the transformer, the meter will register zero.

It is to be noted that my meter can be calibrated and adjusted for use with any particular transformer and/or other apparatus without the need for special test equipment other than the regular rotating standard watthour meters ordinarily used for service testing of meters.

When connected in one circuit of a power transformer for measurement of energy in the other circuit, my meter will register properly whether the flow of energy is direct or reverse. The core and copper loss components of torque will necessarily be continuously in the predetermined direction whereas the component responsive to the energy transmitted at the point of meter connection will reverse with reversal of power flow. This is of particular interest in system interconnections.

It is often desired by a utility to meter the high tension energy supplied to a consumer who generates part of the energy used and operates his generators in parallel with the external supply. In such cases it is customary to require the customer to pay for energy supplied from the external system including the losses in his power transformers, but not to credit him with any energy supplied to the external circuit. My meter, when provided with a ratchet to prevent reverse rotation, is particularly well adapted for metering under these conditions. Reversal of energy flow beyond the supply of losses to the meter will stop the meter. To achieve this result with any other form of secondary metering would prove exceedingly complicated and require considerably more apparatus.

It is an inherent characteristic of commercial watthour meters, adjusted in the customary manner to be accurate at unity power factor for full load and 10% load currents and at 50% power factor for full load current, that their registration at low power factor becomes increasingly inaccurate as the load is reduced from full load to zero. When connected for primary metering of power transformers, such watthour meters do not measure accurately the low-power-factor no-load losses of the transformer. Due to critical conditions inherent in the design, the errors at such light loadings are not consistently in the same direction for all such meters, even when presumably of identical construction, and a test must be made on every meter to determine whether it will be fast or slow at such loadings. However, when these meters are adapted in accordance with my invention and adjusted for conversion of power transformer secondary energy to registration as of the primary circuit (i. e., to account for transformer losses), the critical conditions at such light loads no longer obtain because a predetermined torque has been superimposed on the meter response characteristic. Due to the definite light load characteristic which results when the ordinary meter is adapted according to my invention for measurement of low-power-factor loads such as the no-load losses of power transformers these loads can be metered with good accuracy.

My invention has been described as being used for energy or demand integration, but it should be readily understood that it is equally applicable for indicating power consumption. Furthermore, although I have illustrated my meter for use in single phase circuits for measurement of active energy without potential transformers, it is to be understood that it may be used in polyphase circuits, with or without potential transformers, and for measurements of reactive components of load, in a manner similar to that illustrated in my United States Patent No. 2,218,668 dated October 22, 1940.

Also, my meter may be connected to one part of a circuit for measurement of power or energy at any other part of the circuit whether or not operating at higher voltage and to include or subtract from the measurement the core and copper losses of intermediate rotating or static apparatus. For example, it can be used to measure at standard frequency the power or energy transmitted at desired points in the converted energy circuits of energy conversion devices such as rotary converters, frequency changers, motor-generator sets, electronic rectifiers, etc.

While I have described herein an arrangement of apparatus for carrying out my invention, it will be understood that I do not desire to be limited thereto. Accordingly, I aim in the appended claims to cover all the modifications of my invention obvious to those skilled in the art and within its spirit and scope as herein defined.

The construction and mode of operation of the arrangement illustrated in Fig. 2 are the same as in Fig. 1 with the following exception: A second current transformer 33 is provided and the current coil 9 is connected at its secondary circuit.

I claim:

1. In apparatus for measuring primary alternating current energy on the secondary side of a power transformer, the combination of a power transformer having a primary and secondary winding, translating devices to which the secondary winding distributes energy, an electric meter connected to the power transformer secondary winding, the meter comprising a potential coil and a current coil, a core on which they are wound, a rotatable disk and its adjusting devices, the current coil of the meter being connected in series with the circuit of the secondary winding of a current transformer in series with the translating devices receiving the energy, a second current transformer having its primary connected in series with the secondary of the first current transformer, the secondary of the second current transformer being connected in series with an adjustable reactor and with an adjustable resistor, said reactor and resistance, through their adjustor connections, being connected in parallel with said second current transformer secondary, the parallel combination being connected in series with the potential coil of the meter to influence the character of potential current supply to the potential coil of the meter, the potential current supply obtained by connections to the opposite sides of the circuit supplying energy to the translating devices, a third coil also mounted on the meter core with an adjustable impedance connected in series with the third coil, with such third coil and impedance connected to the opposite sides of the circuit supplying energy to the translating devices.

2. The invention set forth in claim 1 characterized in that the current coil of the meter is connected into the circuit of the secondary winding by way of a second current transformer, and the primary of the first mentioned current transformer is connected to the circuit of the secondary of said second current transformer, and separately to the circuit of the third mentioned meter coil in series with its impedance.

WALTER C. WAGNER.